United States Patent
Choi et al.

(10) Patent No.: US 10,310,520 B2
(45) Date of Patent: Jun. 4, 2019

(54) CONTROL METHOD OF AN IN-HOUSE DEVICE USING A CONTROL KIT AND CONTROL METHOD FOR A WATER PURIFIER USING A CONTROL KIT

(75) Inventors: In-Gyue Choi, Seoul (KR); Jong-Min Kim, Seoul (KR); Tae-Kyung Kang, Seoul (KR)

(73) Assignee: Coway Co., Ltd (KR)

( * ) Notice: Subject to any disclaimer, the term of this patent is extended or adjusted under 35 U.S.C. 154(b) by 580 days.

(21) Appl. No.: 14/130,240

(22) PCT Filed: Jun. 29, 2012

(86) PCT No.: PCT/KR2012/005201
§ 371 (c)(1),
(2), (4) Date: Dec. 30, 2013

(87) PCT Pub. No.: WO2013/002610
PCT Pub. Date: Jan. 3, 2013

(65) Prior Publication Data
US 2014/0172178 A1    Jun. 19, 2014

(30) Foreign Application Priority Data

Jun. 30, 2011 (KR) .................. 10-2011-0064341
Jun. 29, 2012 (KR) .................. 10-2012-0071186

(51) Int. Cl.
G05D 7/06       (2006.01)
H04L 12/28      (2006.01)
H04L 29/08      (2006.01)

(52) U.S. Cl.
CPC ......... *G05D 7/0623* (2013.01); *H04L 12/282* (2013.01); *H04L 12/2814* (2013.01);
(Continued)

(58) Field of Classification Search
None
See application file for complete search history.

(56) References Cited

U.S. PATENT DOCUMENTS 4,342,651 A * 8/1982 Ahrens ................ A61L 2/022
                                                      210/195.2
5,351,199 A * 9/1994 Ticcioni ............... C02F 1/42
                                                      700/282
(Continued)

FOREIGN PATENT DOCUMENTS

JP    08171443       7/1996
JP    2007173995     7/2007
(Continued)

OTHER PUBLICATIONS

Lee KR 10-2009-0000057 (machine translation).*
(Continued)

*Primary Examiner* — Ryan A Jarrett
(74) *Attorney, Agent, or Firm* — The Farrell Law Firm, P.C.

(57) ABSTRACT

There is provided a control method of an in-house device using a control kit having a communications unit communicating with the in-house device and an interface unit, including: the control kit receiving state information including product information regarding the in-house device from the in-house device; the control kit displaying the received state information through the interface unit; the control kit receiving information regarding alteration in the state information regarding the in-house device through the interface unit; and the control kit transmitting the received information regarding the alteration in the state information to the in-house device, wherein the product information regarding the in-house device includes one or more of a product identification number, a product name, a production con-
(Continued)

figuration block diagram, and a product operation setting value of the in-house device.

10 Claims, 9 Drawing Sheets

(52) U.S. Cl.
CPC ...... *H04L 12/2825* (2013.01); *H04L 12/2834* (2013.01); *H04L 67/34* (2013.01); *H04L 2012/285* (2013.01)

(56) References Cited

U.S. PATENT DOCUMENTS

| | | | | |
|---|---|---|---|---|
| 5,587,055 | A * | 12/1996 | Hartman | B01D 3/42 202/162 |
| 2002/0130069 | A1 * | 9/2002 | Moskoff | C02F 1/008 210/85 |
| 2007/0129825 | A1 * | 6/2007 | Kargenian | G16H 40/40 700/83 |
| 2009/0240380 | A1 | 9/2009 | Shah et al. | |
| 2010/0256828 | A1 | 10/2010 | Wang | |
| 2010/0305759 | A1 * | 12/2010 | Paragot | G06Q 50/22 700/271 |
| 2011/0113360 | A1 | 5/2011 | Johnson et al. | |
| 2011/0264568 | A1 * | 10/2011 | Kim | G06Q 30/04 705/30 |
| 2012/0073518 | A1 * | 3/2012 | Kang | C02F 1/008 122/13.01 |

FOREIGN PATENT DOCUMENTS

| | | | | |
|---|---|---|---|---|
| KR | 1020060110073 | | 10/2006 | |
| KR | 1020090000057 | | 1/2009 | |
| WO | WO 2010143864 | A3 * | 3/2011 | ............. C02F 1/008 |

OTHER PUBLICATIONS

European Search Report dated Jan. 7, 2015 issued in counterpart application No. 12804781.8-1862.
European Search Report dated Apr. 17, 2019 issued in counterpart application No. 12804781.8-1216, 7 pages.

* cited by examiner

CONTROL METHOD OF AN IN-HOUSE DEVICE USING A CONTROL KIT AND CONTROL METHOD FOR A WATER PURIFIER USING A CONTROL KIT

This application is a National Phase Entry of PCT International Application No. PCT/KR2012/005201 filed Jun. 29, 2012, and claims priority to Korean Patent Application Nos. 10-2011-0064341 and 10-2012-0071186 filed with the Korean Intellectual Property Office on Jun. 30, 2011 and Jun. 29, 2012, respectively, the content of each of which is incorporated herein by reference.

TECHNICAL FIELD

The present disclosure relates to a control method of an in-house device using a control kit and a control method of a water purifier using a control kit.

BACKGROUND ART

Conventional in-house devices released so far only have a single function or some convenient functions based on a single function.

However, with electronic control techniques advancing, conventional in-house devices have been designed to have micro-processors installed therein and be controlled electronically according to a stored control program, beyond mechanical control schemes.

However, conventional in-house devices have been designed and released with a structure in which extended mechanical configuration or an installed electronic control program is hard to change, or it is impossible to change an automatic control system after installation.

Also, importance of design of in-house devices has been increasing, and in order to enhance utilization of in-house spaces, in-house devices have been undergoing miniaturization. Thus, input/output panels positioned on an outer case may need to have design features or be minimized. However, changes in input/output panels may make it difficult for various users or installers to input various operational patterns to in-house devices.

The recent in-house devices tend to be automatically controlled, rather than allowing users to directly input operational patterns. Thus, the need for manufacturers, installers, or after-sale service men to readjust control patterns of in-house devices upon viewing an installation location or a usage pattern is growing.

In addition, the need for a method for directly setting or altering an electronic control program installed in in-house devices or adjusting an operational schedule is being emphasized.

DISCLOSURE

Technical Problem

An aspect of the present disclosure provides a control method of an in-house device using a control kit and a control method of a water purifier using a control kit, capable of controlling an in-house device and a water purifier using a control kit.

Technical Solution

According to an aspect of the present disclosure, there is provided a control method of an in-house device using a control kit having a communications unit communicating with the in-house device and an interface unit, including: the control kit receiving state information including product information regarding the in-house device from the in-house device; the control kit displaying the received state information through the interface unit; the control kit receiving information regarding alteration in the state information regarding the in-house device through the interface unit; and the control kit transmitting the received information regarding the alteration in the state information to the in-house device, wherein the product information regarding the in-house device includes one or more of a product identification number, a product name, a production configuration block diagram, and a product operation setting value of the in-house device.

The state information may include setting data regarding the in-house device, operation history of the in-house device, user control history input to the in-house device, and failure history of the in-house device.

The information regarding the alteration in the state information regarding the in-house device may include one or more of update data of an operating system of the in-house device and set or altered data of operation setting data of the in-house device.

According to another aspect of the present disclosure, there is provided a control method of an in-house device using a control kit having a communications unit communicating with the in-house device, a storage unit storing detailed product information of the in-house device, and an interface unit, including: the control kit receiving state information including product information regarding the in-house device from the in-house device; the control kit retrieving the detailed product information regarding the in-house device stored in the storage unit corresponding to the received product information regarding the in-house device; the control kit displaying the received state information and detailed product information through the interface unit; the control kit receiving information regarding an alteration in the state information regarding the in-house device through the interface unit; and the control kit transmitting the received information regarding the alteration in the state information to the in-house device, wherein the product information regarding the in-house device includes an identification code of the in-house device.

The detailed product information may include one or more of a product name, a product configuration block diagram, and a product operation setting value of the in-house device.

The state information may include setting data regarding the in-house device, operation history of the in-house device, user control history input to the in-house device, and failure history of the in-house device.

The information regarding the alteration in the state information regarding the in-house device may include one or more of update data of an operating system of the in-house device and set or altered data of operation setting data of the in-house device.

According to another aspect of the present disclosure, there is provided a control method of an in-house device using a control kit having a communications unit communicating with the in-house device, a storage unit storing detailed product information of the in-house device and setting data regarding the in-house device, and an interface unit, including: the control kit receiving state information including product information regarding the in-house device from the in-house device; the control kit retrieving the detailed product information and the setting data regarding the in-house device stored in the storage unit corresponding to the received product information regarding the in-house device; the control kit displaying the received state information, the detailed product information, and the setting data through the interface unit; the control kit receiving information regarding an alteration in the state information or the setting data regarding the in-house device through the interface unit; the control kit transmitting the received information regarding the alteration in the state information or the setting data to the in-house device; and storing the information regarding the alteration in the state information and the setting data in the storage unit by identification codes of the in-house device, wherein the product information regarding the in-house device includes an identification code of the in-house device.

The state information may include adjusted setting data regarding the in-house device, operation history of the in-house device, user control history input to the in-house device, and failure history of the in-house device.

When the adjusted setting data regarding the in-house device is received during the displaying through the interface unit, both the setting data stored in the storage unit and the adjusted setting data may be displayed.

The information regarding the alteration in the state information regarding the in-house device may include one or more of update data of an operating system of the in-house device and set or altered data of operation setting data of the in-house device.

The detailed product information may include one or more of a product name, a product configuration block diagram, and a product operation setting value of the in-house device.

The storage unit may store one or more models with respect to the setting data regarding the in-house device, the displaying through the interface unit may include displaying a model with respect to the setting data stored in the storage unit, and the receiving of the information may include receiving selection information regarding one or more of the models with respect to the displayed setting data.

The storage unit may be detachably attached to the control kit.

The storage unit may further store statistical data of the information regarding the alteration in the state information or the setting data by the identification codes of the in-house device.

According to another aspect of the present disclosure, there is provided a control method of an in-house device using a control kit having a communications unit communicating with the in-house device and a management server, and an interface unit, including: the control kit receiving state information including product information regarding the in-house device from the in-house device; the control kit transmitting the received product information to the management server; the control kit receiving detailed product information regarding the in-house device corresponding to the product information regarding the in-house device received from the management server and setting data regarding the in-house device; the control kit displaying the received state information, the detailed product information, and the setting data through the interface unit; the control kit receiving information regarding an alteration in the state information or the setting data regarding the in-house device through the interface unit; the control kit transmitting the received information regarding the alteration in the state information or the setting data to the in-house device; and transmitting the information regarding the alteration in the state information and the setting data to the management server by identification codes of the in-house device, wherein the product information regarding the in-house device includes an identification code of the in-house device.

The state information may include adjusted setting data regarding the in-house device, operation history of the in-house device, user control history input to the in-house device, and failure history of the in-house device.

When the adjusted setting data regarding the in-house device is received during the displaying through the interface unit, both the setting data stored in the storage unit and the adjusted setting data may be displayed.

The information regarding the alteration in the state information regarding the in-house device may include one or more of update data of an operating system of the in-house device and set or altered data of operation setting data of the in-house device.

The update data of the operating system of the in-house device may be received from the management server and transmitted to the in-house device.

The control kit may further receive one or more models with respect to the setting data regarding the in-house device, the displaying through the interface unit may include displaying a model with respect to the received setting data, and the receiving of the information may include receiving selection information regarding one or more of the models with respect to the displayed setting data.

The control kit may further receive statistical data of the information regarding the alteration in the state information or the setting data by the identification codes of the in-house device from the management server, and further display the statistical data.

According to another aspect of the present disclosure, there is provided a control method of a water purifier using a control kit, including: a water purifier recognizing operation to receive, by the control kit, state information regarding the water purifier from the water purifier; a state information displaying operation to display, by the control kit, the state information regarding the water purifier through an interface unit; an operational pattern input operation to receive an operational pattern of the water purifier through the interface unit; and an operational pattern setting operation to transmit, by the control kit, the received operational pattern to the water purifier to set the water purifier to operate according to the operational pattern.

The operational pattern may include a sterilization pattern performing a sterilization operation to stabilize an interior of the water purifier by the water purifier itself.

The water purifier may include: a filter unit filtering introduced water; a storage tank storing filtered water from the filter unit; a cleansing unit generating a sterilization material, and a controller supplying the sterilization material generated by the cleansing unit to the storage tank to perform a sterilization operation to sterilize the storage tank according to the sterilization pattern.

The operational pattern may further include at least one of a hot water generating pattern generating hot water by the water purifier, a cold water generating pattern generating cold water by the water purifier, and an ice generating pattern generating ice by the water purifier.

The state information may include at least any one of an operational pattern previously set in the water purifier, operation history of the water purifier, user control history input to the water purifier, and failure history of the water purifier.

A usage pattern of the water purifier may be generated by dividing the operation history of the water purifier into pre-set period units during the state information display operation, and the generated usage pattern may be displayed on the interface unit.

The control kit may further include a storage unit storing operational patterns of the water purifier, and an operational pattern corresponding to the usage pattern may be retrieved from the storage unit and displayed on the interface unit during the state information display operation.

The control method may further include: a state information retransmitting operation to re-receive the state information from the water purifier to check an operational pattern set in the water purifier, after the operational pattern setting operation.

The operational pattern setting operation may further include transmitting update data of an operating system installed in the water purifier.

A time of a real time clock (RTC) installed in the water purifier may be updated with a time of an RTC installed in the control kit during the operation pattern setting operation.

Advantageous Effects

In the case of the control method of an in-house device using a control kit according to an exemplary embodiment of the present disclosure, a setting for controlling an in-house device may be altered or updated by using a control key, control history may be managed comprehensively, and a control program installed in an in-house device may be updated.

BEST MODE

Figure 1:
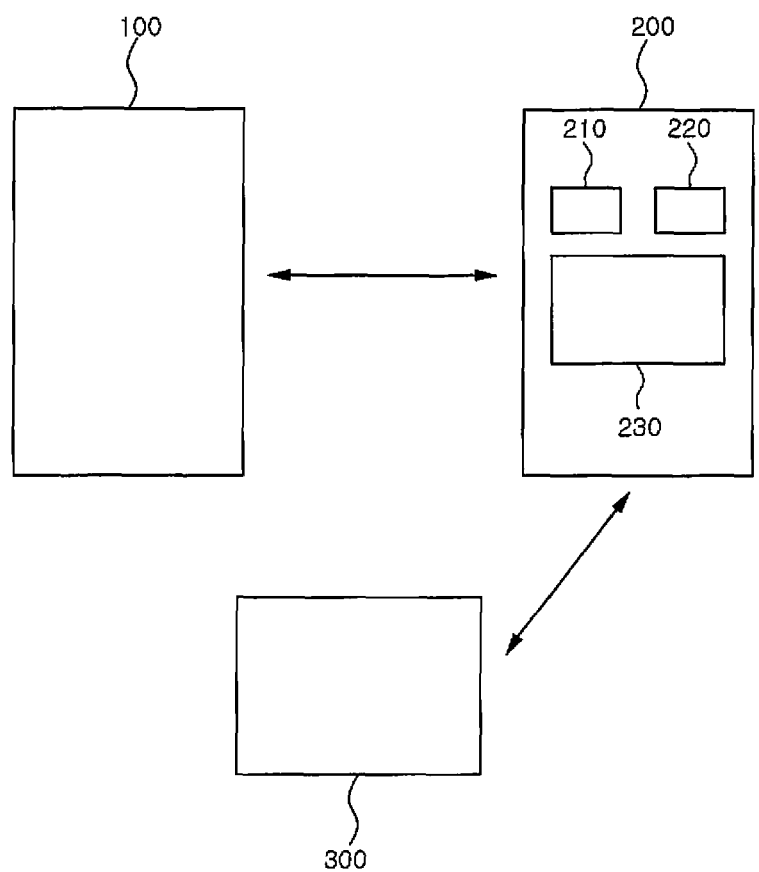
FIG. 1 is a view schematically illustrating a configuration of a system including a control kit for controlling an in-house device according to an exemplary embodiment of the present disclosure.

Hereinafter, embodiments will be described in detail with reference to the accompanying drawings such that they can be easily practiced by those skilled in the art to which the present disclosure pertains. In describing the present disclosure, if a detailed explanation for a related known function or construction is considered to unnecessarily divert the gist of the present disclosure, such explanation will be omitted but would be understood by those skilled in the art.

In order to clarify the present disclosure, parts irrespective of description will be omitted, and similar reference numerals are used for the similar parts throughout the specification.

It will be understood that, unless explicitly described to the contrary, the word "comprise" and variations such as "comprises" or "comprising" will be understood to imply the inclusion of stated elements but not the exclusion of any other elements.

FIG. 1 is a view schematically illustrating a configuration of a system including a control kit for controlling an in-house device according to an exemplary embodiment of the present disclosure.

Referring to FIG. 1, a system including a control kit 200 for controlling an in-house device 100 may include an in-house device 100 and the control kit 200, and may further include a management server 300.

The in-house device 100, a device installed to operate in houses, offices, and the like, may include indoor home appliances such as a water purifier, an air cleaner, an air-conditioner, and the like. The in-house device 100 may include a micro-processor controlling an operation and a memory storing data and programs required for controlling an operation. The in-house device 100 may further include a communications module communicating with the external control kit 200. The communications module may communicate with the control kit 200 in a wired manner or wirelessly. The wired communication method may include a universal serial bus (USB), a universal asynchronous receiver transmitter (DART), and the like, and the wireless communication method may include Bluetooth™, Zig-Bee™, and the like. Mobile communication standards such as 3G, 4G, and the like, may also be employed in a wireless communication module, but such module is costly.

The control kit 200 may include a communications unit 210 and an interface unit 230, and may further include a storage unit 220 according to usage thereof.

The communications unit 210 may include a communications module for communication between the control kit 200 and the in-house device 100, and may further include a communications module for communication with the management server 300 according to usage of the control kit 200.

The interface unit 230 may display data received by a user or data input by the user, and may receive various types of information from the user. The interface unit 230 may be implemented by using a liquid crystal display (LCD) panel, a keyboard, a touch sensor, a touch screen, and the like.

The storage unit 220 may store various types of information for an operation of the control kit 200, and may store information collected from the in-house device 100. The storage unit 220 may include a non-volatile memory for stably storing various types of information, as well as a volatile memory for a processor of a control kit.

Information stored in the storage unit 220, which varies according to usage of the control kit 200, may be detailed product information of the in-house device 100, setting data of the in-house device 100, statistically processed data of the setting data, and the like. Also, the storage unit 220 may be detachable from the control kit. When the storage unit 220 is detached, data thereof may be read by a reader and updated through a writer.

The management server 300 may communicate with the control kit 200 in a wired manner or wirelessly, may receive data read by the reader, and may transmit data t the writer.

A control method of the in-house device 100 based on the control kit 200 may have various embodiments.

First, the control kit 200 may be driven as a simple external interface device of the in-house device 100. In this case, the control kit 200 may largely serve to receive a majority of data required for controlling from the in-house device 100 and provide the same to the user, and deliver data input by the user to the in-house device 100.

Second, the control kit 200 may have various types of information regarding the in-house device 100 stored therein and be driven as a device for changing a control setting, or the like, of the in-house device 100. In this case, the control kit 200 may largely serve to identify the in-house device 100, receive only variable information such as configuration information stored in the in-house device 100, and provide the same to the user, and may serve to deliver data input by the user to the in-house device 100. If necessary, the control kit 200 may convert input data into a data format appropriate for a control system of the in-house device 100 and deliver the same. The in-house device 100 may be mass-produced, so basic design and manufacturing specifications thereof may be stored in the control kit 200 to enhance efficiency of data management. Thus, in this case, only setting data to be altered in each individual in-house device 100 may be transmitted from each in-house device 100 to the control kit 200.

Third, the control kit 200 may be driven as a management device that comprehensively manages one or more in-house devices 100. In this case, the control kit 200 may store data to perform history management with respect to setting data of the individual in-house device 100, failure (or trouble) history management of the individual in-house device 100, and the like. The control kit 200 may further collect information collected by the individual in-house device in an installation space, a setting altered through automatic controlling, or failure history checked through self-diagnoses, or the like, through communication with the individual in-house device 100. Also, the control kit 200 may statistically process and manage collected data and may perform history management through communication with the management server 300 by the medium of the storage unit 220.

Fourth, the control kit 200 may serve as a mediator between the in-house device 100 and the management server 300. Namely, the control kit 200 may be driven as a management device with respect to the in-house device 100 and driven as a terminal delivering collected data with respect to the management server 300. In this case, the role of the control kit 200 may be defined by adjusting an amount of communications data between the management server 300 and the control kit 200 and an amount of data stored in the control kit 200. If a larger amount of data is stored in the management server 300 and the management server 300 processes a large amount of information, the role of the control kit 200 may be limited to that of a mediating terminal. However, if a larger amount of information is stored in the control kit 200 and the management server 300 merely serves to perform a comprehensive history management, and the like, the control kit 200 may serve as an intermediate management terminal.

In the above description, product information regarding the in-house device 100 is stored in the control kit or the corresponding in-house device 100, but according to an implementation method, a control method of the in-house device 100 may be performed such that the user of the control kit 200 inputs a portion or an entirety of state information.

Hereinafter, each exemplary embodiment of a control method of the in-house device 100 based on the control kit 200 will be described with reference to the accompanying drawings.

Figure 2:
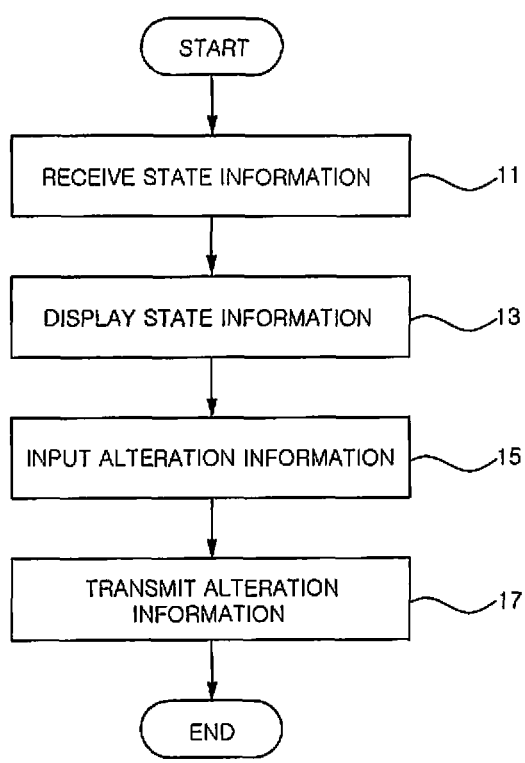
FIG. 2 is a flow chart illustrating a control method of an in-house device using a control kit according to an exemplary embodiment of the present disclosure.

FIG. 2 is a flow chart illustrating a control method of the in-house device using a control kit according to an exemplary embodiment of the present disclosure. Hereinafter, a control method of the in-house device 100 using the control kit 200 according to the exemplary embodiment of the present disclosure will be described with reference to FIGS. 1 and 2.

In operation 11 to receive state information, the control kit 200 may receive the state information including product information regarding the in-house device 100 from the in-house device 100, and the product information regarding the in-house device 100 may include one or more of a product identification number, a product name, a product configuration block diagram, and a setting value for product operation of the in-house device 100. If necessary, the product identification number, the product name, and the like, of the in-house device 100 may be directly input by the user of the control kit 200.

In operation 13 to display state information, the control kit 200 may display the received state information through the interface unit 230. The displayed state information may include the product identification number, the product name, the product configuration block diagram, and the setting values for product operation of the in-house device 100. The displayed state information allows the control kit user to recognize a current state of the in-house device 100 and recognize an item able to be set or altered while controlling the in-house device 100.

In operation 15 to receive altered information, the control kit 200 may receive information regarding alteration in state information regarding the in-house device 100 from the user through the interface unit 230. The input altered information may include one or more of update data of an operating system of the in-house device 100 and set or altered data of operation setting data of the in-house device 100.

In operation 17 to transmit altered information, the control kit 200 may transmit the received information regarding alteration in the state information to the in-house device 100.

The control method of the in-house device 100 using the control kit 200 according to the exemplary embodiment of the present disclosure is a method of controlling the in-house device 100 using the control kit 200 as a dependent interface device. In case of initially setting up the in-house device 100 after installation in a particular location or in case of updating a setting of the in-house device 100 periodically or aperiodically, the control method of the in-house device 100 using the control kit 200 according to the exemplary embodiment of the present disclosure may be applied. Also, the control method of the in-house device 100 using the control kit 200 according to the exemplary embodiment of the present disclosure may be applied in altering update of bias, firmware, or the like, in addition to altering setting values of a control program of the in-house device 100.

Employing the control method of the in-house device 100 using the control kit 200 according to the exemplary embodiment of the present disclosure, an installer, an operator, and the like, may easily control the in-house device 100.

Figure 3:
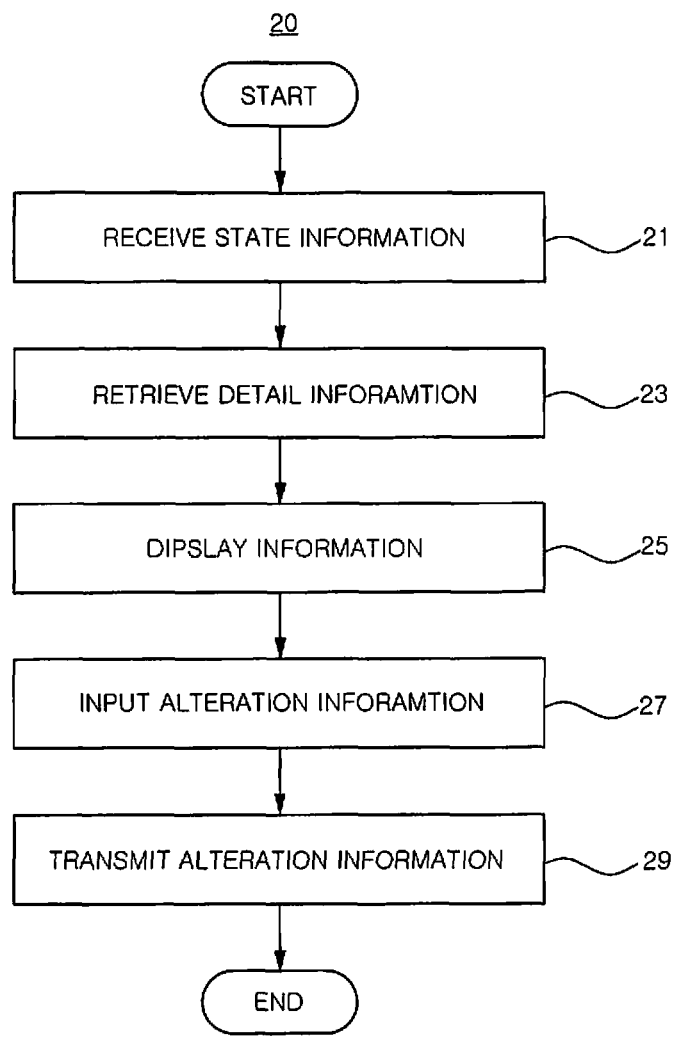
FIG. 3 is a flow chart illustrating a control method of an in-house device using a control kit according to another exemplary embodiment of the present disclosure.

FIG. 3 is a flow chart illustrating a control method of an in-house device using a control kit according to another exemplary embodiment of the present disclosure. Hereinafter, the control method of an in-house device 100 using a control kit 200 according to another exemplary embodiment of the present disclosure will be described with reference to FIGS. 1 and 3. The control kit 200 employing the control method of the in-house device 100 using the control kit 200 according to another exemplary embodiment of the present disclosure includes a storage unit 220 storing detailed product information regarding the in-house device 100.

In operation 21 to receive state information, the control kit 200 may receive state information including product information regarding the in-house device 100 from the in-house device 100, and the product information may include a product identification code of the in-house device 100. If necessary, the product identification code, or the like, of the in-house device 100 may be directly input by the user of the control kit 200. Also, the state information may include set data regarding the in-house device 100, operation history of the in-house device 100, user control history input to the in-house device 100, and failure history of the in-house device 100.

In operation 23 to retrieve detailed product information, the control kit 200 may retrieve the detailed product information regarding the in-house device 100 stored in the storage unit 220 corresponding to the received product information regarding the in-house device 100. The detailed product information may include one or more of a product name, a product configuration block diagram, and a product operation setting value of the in-house device 100.

In operation 25 to display state information, the control kit 200 may display the received state information through the interface unit 230. The displayed state information may include the product identification number, the product name, the product configuration block diagram, and the product operation setting value of the in-house device 100. Also, in operation 25 to display the state information, the setting data regarding the in-house device 100, the operation history of the in-house device 100, the user control history input to the in-house device 100, and the failure history of the in-house device 100 may be further displayed. The displayed state information allows the control kit user to recognize a current state of the in-house device 100 and the operation history and failure history of the product, and recognize an item to be set or altered while controlling the in-house device 100.

In operation 27 to receive altered information, the control kit 200 may receive information regarding alteration in the state information regarding the in-house device 100 from the user through the interface unit 230. The input altered information may include one or more of update data of an operating system of the in-house device 100 and set or altered data of operation setting data of the in-house device 100.

In operation 29 to transmit altered information, the control kit 200 may transmit the received information regarding alteration in the state information to the in-house device 100.

The control method of the in-house device 100 using the control kit 200 according to another exemplary embodiment of the present disclosure is a method of controlling the in-house device 100 using the control kit 200 as a device having information regarding the in-house device stored therein and able to change control setting, and the like, of the in-house device 100. In case of initially setting up the in-house device 100 after installation of the in-house device 100 in a particular location or in case of updating a setting of the in-house device 100 periodically or aperiodically, the control method of the in-house device 100 using the control kit 200 according to the exemplary embodiment of the present disclosure may be applied. Also, the control method of the in-house device 100 using the control kit 200 according to another exemplary embodiment of the present disclosure may be applied in altering update of bias, firmware, or the like, in addition to altering setting values of a control program of the in-house device 100.

Figure 4:
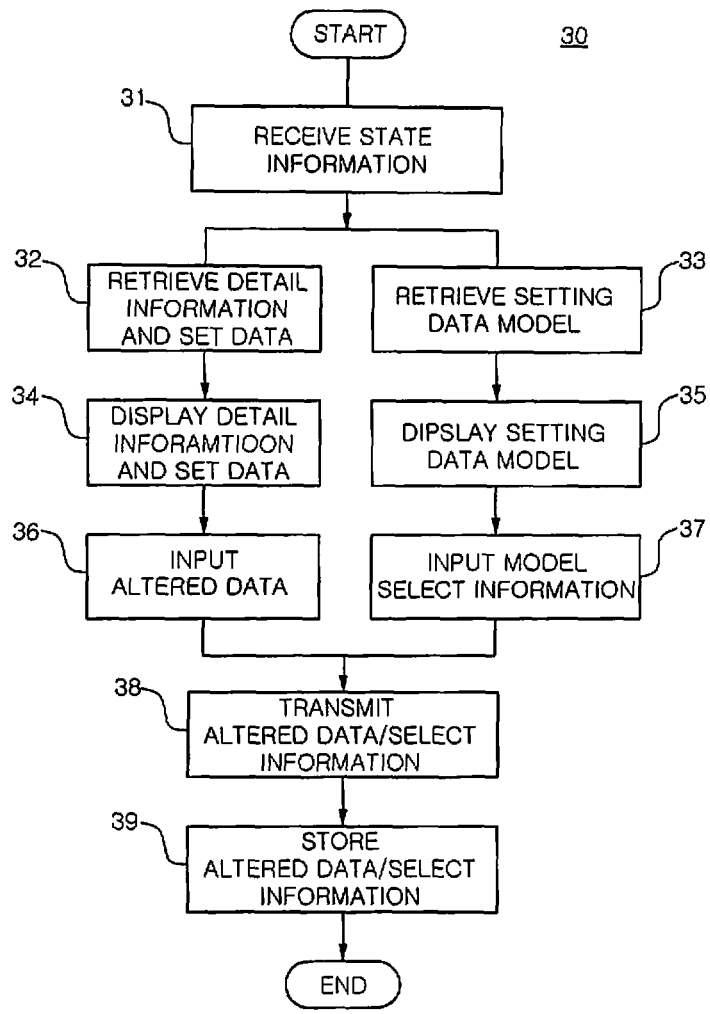
FIG. 4 is a flow chart illustrating a control method of an in-house device using a control kit according to another exemplary embodiment of the present disclosure.

FIG. 4 is a flow chart illustrating a control method of an in-house device using a control kit according to another exemplary embodiment of the present disclosure. Hereinafter, the control method of an in-house device 100 using a control kit 200 according to another exemplary embodiment of the present disclosure will be described with reference to FIGS. 1 and 4. The control kit 200 employing the control method of the in-house device 100 using the control kit 200 according to another exemplary embodiment of the present disclosure includes a storage unit 220 storing detailed product information regarding the in-house device 100 and setting data regarding the in-house device 100.

In operation 31 to receive state information, the control kit 200 may receive the state information including product information regarding the in-house device 100 from the in-house device 100, and the product information may include a product identification code of the in-house device 100. If necessary, the product identification code, or the like, of the in-house device 100 may be directly input by the user of the control kit 200. Also, the state information may include set data regarding the in-house device 100, operation history of the in-house device 100, user control history input to the in-house device 100, and failure history of the in-house device 100.

In operation 32 to retrieve detailed product information and setting data, the control kit 200 may retrieve the detailed product information regarding the in-house device 100 and the setting data stored in the storage unit 220 corresponding to the received product information regarding the in-house device 100. The detailed product information may include one or more of a product name, a product configuration block diagram, and a product operation setting value of the in-house device 100.

In operation 34 to display detailed information and setting data, the control kit 200 may display the received state information and the setting data through the interface unit 230. The displayed state information may include the product identification number, the product name, the product configuration block diagram, and the product operation setting value of the in-house device 100. Also, in operation 25 to display the state information, the setting data regarding the in-house device 100, the operation history of the in-house device 100, the user control history input to the in-house device 100, and the failure history of the in-house device 100 may be further displayed. The displayed state information allows the control kit user to recognize a current state of the in-house device 100 and the operation history and failure history of the product, and recognize an item to be set or altered while controlling the in-house device 100.

In operation 36 to receive altered data, the control kit 200 may receive information regarding alteration in the state information regarding the in-house device 100 from the user through the interface unit 230. The input altered information may include one or more of update data of an operating system of the in-house device 100 and set or altered data of operation setting data of the in-house device 100.

In operation 33 to retrieve setting data mode, the control kit 200 may retrieve the setting data model stored in the storage unit 220 corresponding to the received product information regarding the in-house device 100. The setting data model may include information regarding automatic control patterns based on statistics about installation location of the in-house device 100, the user usage pattern of the in-house device 100, and the like. For example, in case of a water purifier furnished to general companies, the water purifier may have little to no use on weekends, so an operational pattern of emptying and automatically cleansing the water purifier on weekends may be derived and made to be a setting data model. Such a setting data model may be derived through history management with respect to usage patterns of the same or similar in-house devices 100 or may be derived according to a request or proposal from the user of the in-house device 100. The setting data model may be stored in the storage unit 220, and may be created by the user of the control kit 200 or received from an external device.

In operation 35 to display setting data model, the control kit 200 may display the retrieved setting data model corresponding to the in-house device 100 through the interface unit 230.

In operation 37 to input model selection information, the control kit 200 may receive the selection information with respect to one or more of the setting data models of the in-house device 100 from the user through the interface unit 230.

Operation 35 to display setting data model and operation 37 to input model selection information may be performed simultaneously with operation 34 to display the detailed information and setting data and operation 36 to receive altered data. Through operation 35 to display setting data model and operation 37 to receive model selection information, the user may more conveniently change and set control settings, or the like, of the in-house device 100.

In operation 38 to transmit altered data/selection information, the control kit 200 may transmit the received information regarding alteration in the state information and/or setting data model selection information to the in-house device 100.

In operation 39 to store altered data/selection information, the control kit 200 may store the received information regarding alteration in the state information and/or the setting data model selection information in the storage unit 220. Operation 38 to transmit altered data/selection information and operation 39 to store the altered data/selection information may be interchangeable, and the user of the control kit 200 may control whether to perform operation 39 to store altered data/selection information.

Through operation 39 to store altered data/selection information, the control kit 200 may obtain data for comprehensively managing history of setting and changing control, and the like, of the in-house device 100.

The control method of the in-house device 100 using the control kit 200 according to another exemplary embodiment of the present disclosure is a method of controlling the in-house device 100 using the control kit 200 as a management device capable of comprehensively managing one or more in-house devices 100. Since the control kit 200 has data regarding one or more in-house devices 100, the control kit 200 may classify and store the data by identification codes of the in-house device 100 for comprehensive management and may further store statistical data thereof. In addition, the storage unit 220 may be detachably attached to the control kit 200, so that data of the storage unit 220 may be managed by using an external device. In case of initially setting up the in-house device 100 after installation of the in-house device 100 in a particular location or in case of updating a setting of the in-house device 100 periodically or aperiodically, the control method of the in-house device 100 using the control kit 200 according to the exemplary embodiment of the present disclosure may be applied. Also, the control method of the in-house device 100 using the control kit 200 according to another exemplary embodiment of the present disclosure may be applied in altering update of bias, firmware, or the like, in addition to altering setting values of a control program of the in-house device 100. In addition, through the control method of the in-house device 100 using the control kit 200 according to another exemplary embodiment of the present disclosure, the user of the control kit 200 may comprehensively manage a plurality of in-house devices 100 and inspect and manage usage patterns, and the like.

Figure 5:
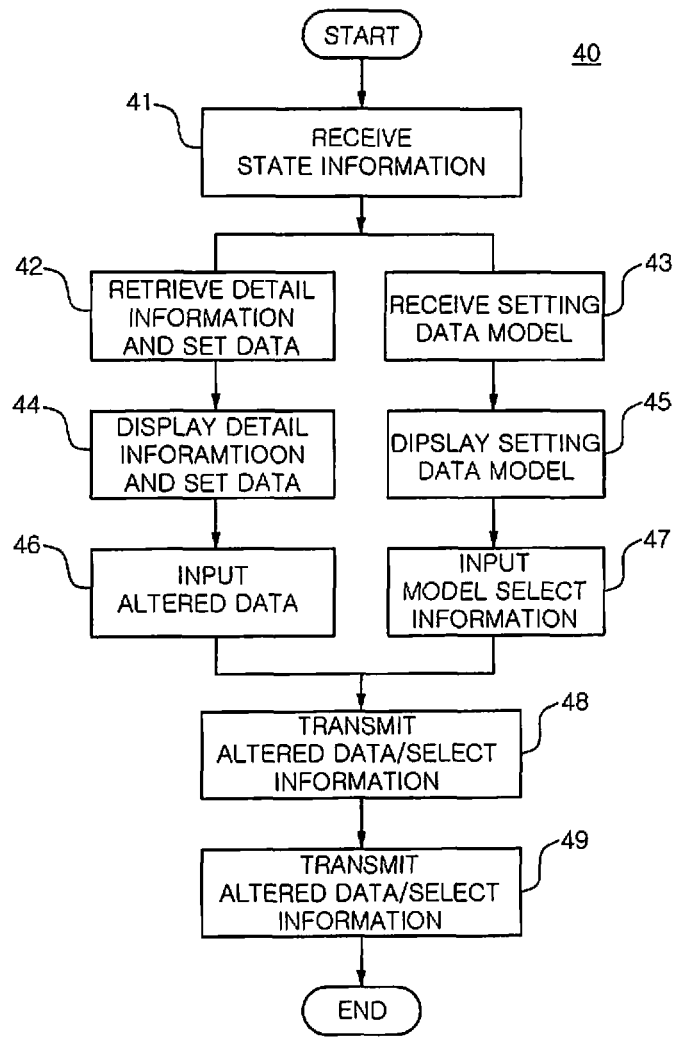
FIG. 5 is a flow chart illustrating a control method of an in-house device using a control kit according to another exemplary embodiment of the present disclosure.

FIG. 5 is a flow chart illustrating a control method of an in-house device using a control kit according to another exemplary embodiment of the present disclosure. Hereinafter, the control method of an in-house device 100 using a control kit 200 according to another exemplary embodiment of the present disclosure will be described with reference to FIGS. 1 and 5. The control kit 200 employing the control method of the in-house device 100 using the control kit 200 according to another exemplary embodiment of the present disclosure includes a communications unit 210 able to communicate with a management server 300 as well as the in-house device 100.

In operation 41 to receive state information, the control kit 200 may receive state information including product information regarding the in-house device 100 from the in-house device 100, and the product information may include a product identification code of the in-house device 100. If necessary, the product identification code, or the like, of the in-house device 100 may be directly input by the user of the control kit 200. Also, the state information may include setting data regarding the in-house device 100, operation history of the in-house device 100, user control history input to the in-house device 100, and failure history of the in-house device 100.

In operation (not shown) to transmit product information to the management server 300, the control kit 200 may transmit the received product information to the management server 300. In this manner, the control kit 200 may request data required to control the in-house device 100 from the management server 300.

In operation 42 to receive detailed information and setting data, the control kit 200 may receive the product detailed information regarding the in-house device 100 corresponding to the product information regarding the in-house device 100 received from the management server 300 and setting data regarding the in-house device 100. Namely, the control kit 200 may receive information regarding the corresponding in-house device 100 stored in the management server 300.

In operation 44 to display detailed information and setting data, the control kit 200 may display the received state information setting data through the interface unit 230. The displayed state information may include the product identification number, the product name, the product configuration block diagram, and the product operation setting value of the in-house device 100. Also, in operation 25 to display the state information, the setting data regarding the in-house device 100, the operation history of the in-house device 100, the user control history input to the in-house device 100, and the failure history of the in-house device 100 may be further displayed. The displayed state information allows the control kit user to recognize a current state of the in-house device 100 and the operation and failure history of the product, and recognize an item to be set or altered while controlling the in-house device 100.

In operation 46 to receive altered data, the control kit 200 may receive information regarding alteration in state information regarding the in-house device 100 from the user through the interface unit 230. The input altered information may include one or more of update data of an operating system of the in-house device 100 and set or altered data of operation setting data of the in-house device 100.

In operation 43 to receive setting data model, the control kit 200 may receive one or more models with respect to the setting data regarding the in-house device 100 from the management server 300.

The setting data model may include information regarding patterns automatically controlled based on statistics about an installation location of the in-house device 100, the user usage pattern of the in-house device 100, and the like. For example, in case of a water purifier furnished in general companies, the water purifier may have little to no use on weekends, so an operational pattern of emptying and automatically cleansing the water purifier on weekends may be derived and made to setting data model. Such a setting data model may be derived through history management with respect to usage patterns of the same or similar in-house devices 100 or may be derived according to a request or proposal of the user of the in-house device 100. The setting data model may be stored in the management server 300, and the management server 300 may create the setting data model by synthesizing the collected setting and usage history of the in-house device 100 and analyzing a corresponding pattern thereof.

In operation 45 to display setting data model, the control kit 200 may display the received setting data model corresponding to the in-house device 100 through the interface unit 230.

In operation 47 to input model selection information, the control kit 200 may receive selection information with respect to one or more of setting data models of the in-house device 100 from the user through the interface unit 230.

Operation 45 to display setting data model and operation 47 to input model selection information may be performed simultaneously with operation 44 to display the detailed information and setting data and operation 46 to receive altered data. Through operation 45 to display setting data model and operation 47 to receive model selection information, the user may change and set control setting, or the like, of the in-house device 100 more conveniently.

In operation 48 to transmit altered data/selection information, the control kit 200 may transmit the received information regarding alteration in the state information and/or setting data model selection information to the in-house device 100.

In operation 49 to transmit altered data/selection information, the control kit 200 may transmit the received information regarding alteration in the state information and/or setting data model selection information to the management server 300. Operation 48 to transmit altered data/selection information and operation 49 to transmit altered data/selection information may be interchanged, and whether to perform operation 49 to transmit altered data/selection information may be controlled by the user of the control kit 200.

Through operation 49 to transmit altered data/selection information, the management sever 300 may obtain data for comprehensively managing history of setting and changing control, and the like, of the in-house device 100.

The control method of the in-house device 100 using the control kit 200 according to another exemplary embodiment of the present disclosure is a method of controlling the in-house device 100 using the control kit 200 as a mediator between the in-house device 100 and the management server 300 and as a management device with respect to the in-house device 100. Since the management server 300 has data regarding one or more in-house devices 100, the management server 300 may classify and store the data by identification codes of the in-house device 100 for comprehensive management.

In case of initially setting up the in-house device 100 after installation of the in-house device 100 in a particular location or in case of updating a setting of the in-house device 100 periodically or aperiodically, the control method of the in-house device 100 using the control kit 200 according to the exemplary embodiment of the present disclosure may be applied. Also, the control method of the in-house device 100 using the control kit 200 according to another exemplary embodiment of the present disclosure may be applied in altering update of bias, firmware, or the like, in addition to setting values of a control program of the in-house device 100. In addition, through the control method of the in-house device 100 using the control kit 200 according to another exemplary embodiment of the present disclosure, the management server 300 may comprehensively manage a plurality of in-house devices 100 and inspect and manage usage patterns, and the like.

The in-house device 100 may be installed in an environment in which communication between the management server 300 and the control kit 200 is not performed smoothly. In this case, a predetermined portion of data required for controlling the corresponding in-house device 100 may be stored in the control kit 200 by adjusting a range of storage data between the management server 300 and the control kit 20, and the control kit 200 may transmit and receive data and update the stored data by communicating with the management server 300 periodically or according to user manipulation.

Figure 6:
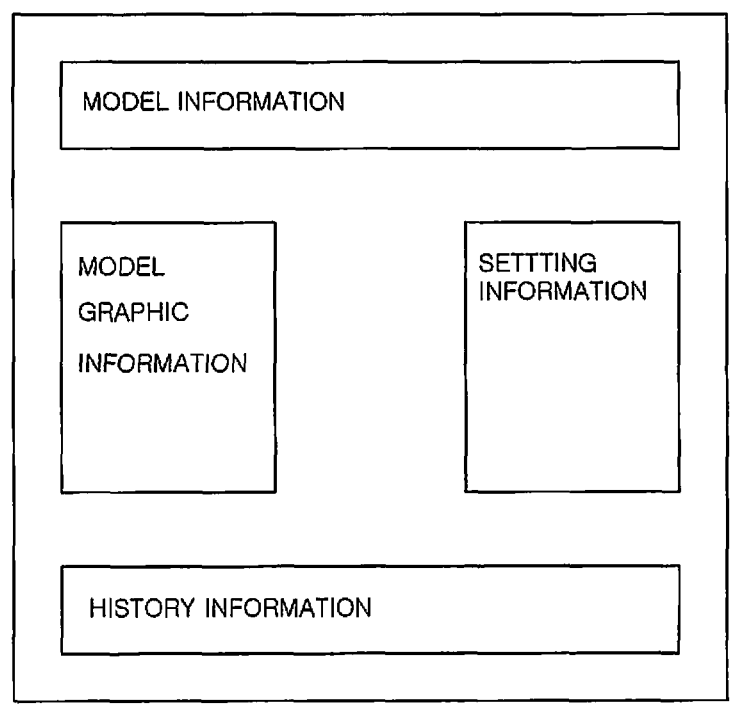
FIG. 6 is a view illustrating an example of a screen displayed by driving a control kit employing the control method of an in-house device using a control kit according to an exemplary embodiment of the present disclosure.

FIG. 6 is a view illustrating an example of a screen displayed by driving a control kit employing the control method of an in-house device using a control kit according to an exemplary embodiment of the present disclosure.

Referring to FIG. 6, basic model information regarding the in-house device 100 as a control target may be displayed and information for setting may be displayed. Also, graphic information such as a product configuration block diagram of the corresponding in-house device 100 may be displayed to allow a user to recognize the setting of the corresponding in-house device 100 more intuitively. Also, setting history or failure history of the in-house device 100 obtained from the corresponding in-house device 100, stored in the control kit 200, or received from the management server 300 may be further displayed.

By displaying such information, the control kit 200 may provide various types of information to the user, and the user may perform setting control based on the information.

Also, in a case in which the interface unit 230 is implemented as a device such as a touch screen, a setting may be changed in a displayed model graphic information window or a configuration to be controlled may be selected, and information whose setting has been altered may be selected from setting information.

An embodiment in which an in-house device is controlled through a control kit employing a control method of an in-house device according to the present disclosure will be described.

First, a control program installed in the in-house device may be updated to a newer version. An electronic control program may be continuously updated, so the control program may be updated by using the control kit during inspection of the in-house device, and the like.

Second, a setting of the in-house device may be altered by checking a usage environment and failure of the in-house device. An installation environment of the product may be monitored, and when an inspector recognizes a change in the environment during service inspection, the inspector may reflect the change in a control setting. Also, when the product breaks down, the inspector may check an operation of the product and a change in an environment thereof at a corresponding time.

Third, service staff or an inspector may check an installation date, a service period, and an estimated inspection date of the in-house device to check a schedule for providing filter or any other service behaviors based on the installation date.

Fourth, in case of an in-house device having a sterilization function, a service provider may check a sterilization period input and information stored in the product, and set the product to operate according to time and intervals requested by a client during installation of the product.

Figure 7:
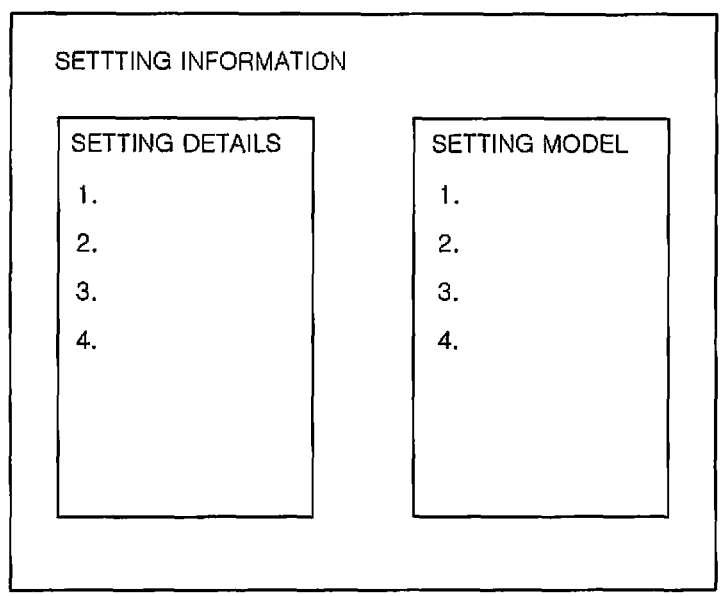
FIG. 7 is a view illustrating an example of a setting information window of a screen displayed by driving a control kit employing the control method of an in-house device using a control kit according to an exemplary embodiment of the present disclosure.

FIG. 7 is a view illustrating an example of a setting information window of a screen displayed by driving a control kit employing the control method of an in-house device using a control kit according to an exemplary embodiment of the present disclosure.

Referring to FIG. 7, setting details may be displayed on a setting information window, and setting models stored in the control kit 200 or received from the management server 300 may be displayed on the window.

The setting models refer to the setting data model as described above.

The setting models include data for collectively changing an entirety or a portion of the setting details into pre-set values. When the user selects one or more of the setting models, the setting values of the setting details may be altered according to the setting mode.

In this manner, the user of the control kit 200 may control the in-house device 100 more conveniently.

The user of the control kit 200 employing the control method of the in-house device 100 according to the exemplary embodiment of the present disclosure may be an installer of the corresponding in-house device 100, a manager managing the corresponding in-house device 100, or service staff providing an after-sales service with respect to the corresponding in-house device 100.

The control kit 200 may be a product designed to employ the control method of the in-house device 100 according to the present exemplary embodiment, and the control kit 200 may be a mobile terminal such as a smartphone or a personal digital assistant (PDA) if necessary.

If a general user erroneously changes a setting value of the in-house device 100 with the control kit 200, it may fatally affect an operation of the in-house device 100 or may cause damage to other users. In order to prevent this, an authentication process of the user of the control kit 200 may be performed.

According to another exemplary embodiment of the present disclosure, a water purifier may be controlled by using a control kit.

Here, the water purifier may be the in-house device 100 as mentioned above and may include a microprocessor controlling an operation, a memory storing data and a program required for controlling an operation, and a communications module for communicating with an external control kit. The communications module may communicate with the control kit in a wired manner or wirelessly. A USB, a UART, and the like, may be utilized for wired communication, and Bluetooth™, ZigBee™, and the like, may be utilized for wireless communication. In addition, the communications module may utilize mobile communication standards such as 3G, 4G, and the like.

Figure 9:
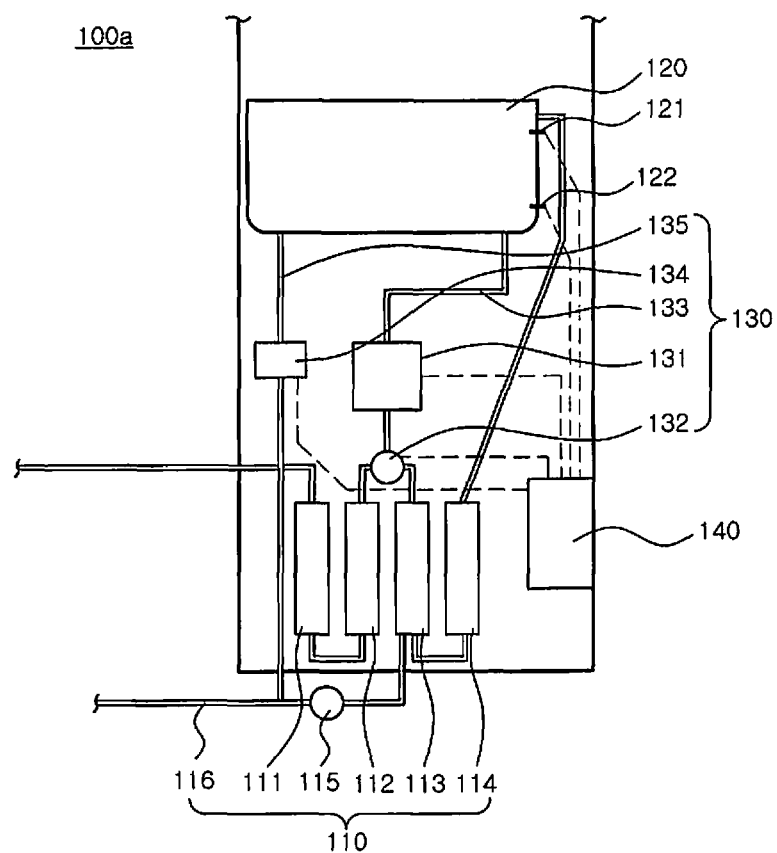
FIG. 9 is a view schematically illustrating a configuration of the water purifier in the control method of a water purifier using a control kit according to another exemplary embodiment of the present disclosure.

Also, the water purifier may perform sterilization operation on an interior thereof. In detail, as illustrated in FIG. 9, the water purifier 100a may include a filter unit 110, a storage tank 120, a cleansing module 130, and a controller 140. The water purifier 100a may perform a sterilization operation by itself, according to a control operation of the controller 140.

First, the controller 140 may operate the water purifier 100a in a general mode to filter introduced water to generate purified water. The generated purified water may be stored in the storage tank 120 and subsequently supplied to a user, and in this case, the controller 140 may heat or cool the purified water by using a heater or a cooler and provide the same to the user. Here, the filter unit 110 may comprise a plurality of filters, and in particular, may include a sediment filter 111, a pre-carbon filter 112, a reverse osmotic (RO) membrane filter 113, and a post-carbon filter 114. The RO membrane filter 113 may further include a water drain pipe 116 draining residential water generated during a filtering process, and the water drain pipe 116 may include a check valve 115.

Thereafter, the controller 140 may operate the water purifier 100a in a sterilization operation mode to change a flow path in which a flow path changing valve 132 is connected to the filter unit 110 to allow water to be supplied from the filter unit 110 to the cleansing unit 131. Here, the cleansing unit 131 may generate sterilizing water by using water supplied from the filter unit 110 under the control of the controller 140, and the sterilized water may be supplied to the storage tank 120 along a connection pipe 133. Here, the sterilizing water may be supplied until a full water level sensor 121 senses it, and the sterilizing water may perform sterilization on the storage tank 120 and be subsequently drained out through a drain pump 134 along the drain pipe 135.

When the sterilization operation is finished, namely, when a low water level sensor 122 senses the complete drainage of the sterilizing water, the controller 140 may change a flow path by the flow path changing valve 132 to supply purified water generated by the filter unit 110 to the storage tank 120. The purified water supplied to the storage tank 120 may cleanse the storage tank 120. When the cleansing is completed, the purified water may be drained, thus finishing the cleansing operation on the storage tank 120.

Here, a point at which the water purifier 100a is switched from the general mode to the sterilization operation mode may be determined according to a pre-set sterilization pattern. The sterilization, pattern may be set in advance in the water purifier but a point at which the water purifier is required to be sterilized may vary according to usage frequency of the water purifier, a usage pattern of the water purifier, an installation location of the water purifier, and the like. Thus, a sterilization pattern of the water purifier may be reset upon receiving the sterilization pattern from the control kit.

Here, the control kit may include a communications unit and an interface unit as described above, and may further include a storage unit according to usage of the control kit. The communications unit may perform wired and wireless communications between the control kit and the water purifier, and the interface unit may serve to display state information, or the like, of the water purifier for a user and receive various types of information such as an operational pattern, and the like, from the user. The interface unit may be implemented by using an LCD panel, a keyboard, a touch sensor, a touch screen, and the like. The storage unit may store various types of information for an operation of the control kit and may store information received from the water purifier. The storage unit may include a non-volatile memory for stably storing various types of information, as well as a volatile memory for a processor of the control kit.

Figure 8:
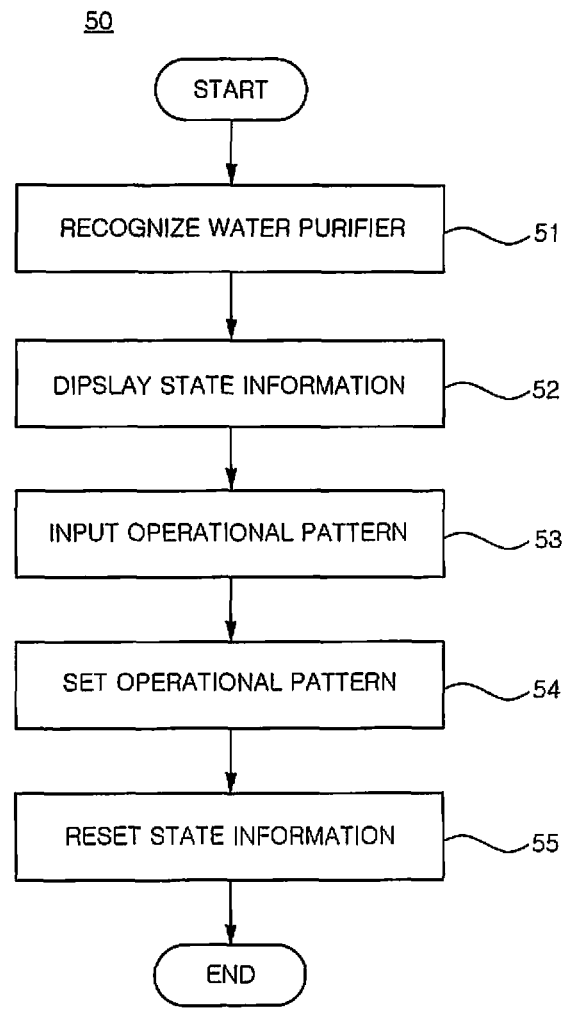
FIG. 8 is a flow chart illustrating a control method of a water purifier using a control kit according to another exemplary embodiment of the present disclosure.

FIG. 8 is a flow chart illustrating a control method of a water purifier using a control kit according to another exemplary embodiment of the present disclosure.

Referring to FIG. 8, a control method 50 of a water purifier using the control kit may include a water purifier recognizing operation 51, a state information displaying operation 52, an operational pattern inputting operation 53, an operational pattern setting operation 54, and a state information retransmitting operation 55.

Hereinafter, the control method 50 of a water purifier using a control kit according to another exemplary embodiment of the present disclosure will be described.

In the water purifier recognizing operation 51, the control kit may receive state information regarding the water purifier. As discussed above, the water purifier and the control kit may exchange information through wired and wireless communications, so the water purifier may transmit state information regarding the water purifier to the control kit.

Here, the state information may include an operational pattern previously set in the water purifier, operation history of the water purifier, user control history input to the water purifier, failure history of the water purifier, and the like. In detail, the operational pattern is used to control a general operation of the water purifier, and water ejection temperature of the water purifier, a generation amount of cold and hot water, an operation period of a heater, and the like, may be determined according to the operational pattern, and a sterilization period, and the like, of the storage tank may be determined according to the operational pattern.

In the state information displaying operation 52, the control kit may display the state information regarding the water purifier through an interface unit. Thus, the user may check a state of the water purifier based on the state information regarding the water purifier displayed on the interface unit. Thereafter, the user may determine input with respect to the water purifier based on the state of the water purifier recognized from the state information.

Here, in the state information displaying operation 52, a usage pattern of the water purifier may be generated by dividing the operation history of the water purifier by a pre-set period unit, and the generated usage pattern may be displayed on the interface unit. Here, the pre-set period unit may be set to a day unit, a week unit, a month unit, a season unit, and the like, whereby a usage pattern by day, a usage pattern by week, a usage pattern by month, a usage pattern by season, and the like, with respect to the water purifier may be obtained. Thereafter, the operational pattern of the water purifier may be adjusted according to the usage pattern, thus promoting efficient use of the water purifier.

For example, in case of a water purifier furnished in general companies, the water purifier may have little to no use on weekends, so an operational pattern may be set to empty and perform a sterilization operation on the water purifier on weekends. Also, since there is an increase in usage amount of cold water relative to hot water during the summer, a generation amount of hot water may be controlled to be reduced and a generation amount of cold water may be controlled to be increased.

In addition, the control kit may recommend an operational pattern fitting a usage pattern of the water purifier, and display the same on the interface unit. Namely, after operational patterns of the water purifier corresponding to respective usage patterns are stored in the storage unit of the control kit, a usage pattern similar to that received from the water purifier may be retrieved and a corresponding operational pattern may be output.

In the operational pattern inputting operation 53, an operational pattern of the water purifier may be received through the interface unit. The user may wish to change an operational pattern of the water purifier based on state information regarding the water purifier, and in this case, the user may input a new operational pattern with respect to the water purifier through the interface unit.

As discussed above, the operational pattern is used to control a general operation of the water purifier, and may include a sterilization pattern for performing a sterilization operation to sterilize the interior of the water purifier by itself, a hot water generation pattern for generating hot water by the water purifier, a cold water generation pattern for generating cold water, an ice generation pattern for generating ice, and the like.

Also, the storage unit of the control kit may have operational patterns of the water purifier stored therein, so the user may input an operational pattern of the water purifier by selecting any one of the operational patterns stored in the control kit.

In the operational pattern setting operation 54, the control kit may transmit the input operational pattern to the water purifier to set the water purifier to operate according to the operational pattern. When an operational pattern to be set in the water purifier is input to the control kit, the control kit may transmit the operational pattern to the water purifier and the water purifier may store the received operational pattern as a new operational pattern. Thereafter, the water purifier may operate according to the new operational pattern.

Here, the control kit may further transmit data for updating an operating system, and the like, installed in the water purifier, aside from the operational pattern. In order to increase user convenience of the water purifier, a bias, firmware, and the like, of the water purifier may require frequent updates. Thus, when the operational pattern of the water purifier is set, a program installed in the water purifier may be updated in conjunction therewith.

Also, in the case of updating a program, a time of a real time clock (RTC) installed in the water purifier may be updated as a time of the control kit. In the case of the water purifier, an operation of the installed RTC may be affected by the operation of the water purifier, and the like, and the RTC may become slow or fast in comparison to an actual time. Various operations including the sterilization operation of the water purifier use a time provided by the RTC in many cases, so an error of the time of the RTC may paralyze operation of the water purifier. Thus, in case of an update, the control kit may update a time of the water purifier with a time thereof to resolve an error of the RTC of the water purifier.

In the state information retransmitting operation 55, the state information may be received again from the water purifier to check the operational pattern set in the water purifier, after the operational pattern setting operation 54. When the operational pattern of the water purifier is set or a program of the water purifier is updated by using wired and wireless communications, erroneous information may be transmitted or an update may not be properly performed for various reasons. In this case, the operational pattern set in the water purifier may be different from the operational pattern input by the user to the control kit, and the water purifier may malfunction. Thus, in order to ascertain the operational pattern set in the water purifier and whether updating has been performed, the state information may be received again from the water purifier. The state information transmitted from the water purifier may include information regarding the update, as well as the operational pattern of the water purifier, and thus, the set operational pattern and whether the update has been normally performed with respect to the water purifier may be ascertained.

Here, the case of utilization of a water purifier as an in-house device has been illustrated, but the present disclosure may also be applied to various types of water treatment devices such as a water ionizer, a coffee maker, a beverage providing device, and the like, similar to the water purifier. In addition, the controlling operation as described above may also be applied to an air cleaner, a bidet, and the like, as an in-house device in a similar manner.

While exemplary embodiments have been shown and described above, it will be apparent to those skilled in the art that modifications and variations could be made without departing from the spirit and scope of the present disclosure as defined by the appended claims.

The invention claimed is:

1. A method of controlling a water purifier, the method comprising:
receiving, by a control kit, state information regarding the water purifier from the water purifier;
displaying, by the control kit, the state information through an interface of the control kit;
receiving an operational pattern of the water purifier through the interface; and
transmitting, by the control kit, the received operational pattern to the water purifier to operate the water purifier,
wherein the operational pattern is information for controlling a sterilization operation, a hot water generating operation, a cold water generating operation and an ice generating operation,
wherein the operational pattern comprises at least one of a sterilization period of the water purifier and an ejection temperature of the water purifier, and
wherein the control kit is separate from the water purifier and is configured to wirelessly transmit data to the water purifier to update an operating system installed in the water purifier.

2. The method of claim 1, wherein the operational pattern comprises a sterilization pattern for performing the sterilization operation to stabilize an interior of the water purifier by the water purifier itself.

3. The method of claim 1, wherein the water purifier comprises:
a filter unit configured to filter introduced water,
a storage tank configured to store filtered water from the filter unit,
a cleansing unit configured to generate a sterilization material, and
a controller configured to control supplying of the generated sterilization material to the storage tank to perform the sterilization operation to sterilize the storage tank according to the sterilization pattern.

4. The method of claim 1, wherein the operational pattern further comprises at least one of a hot water generating pattern for generating hot water by the water purifier and an ice generating pattern for generating ice by the water purifier.

5. The method of claim 1, wherein the state information further comprises at least one of an operational pattern previously set in the water purifier, a user control history input to the water purifier, and a failure history of the water purifier.

6. The method of claim 1, wherein the state information comprises an operation history of the water purifier, and
wherein a usage pattern of the water purifier is generated by dividing the operation history of the water purifier into pre-set periods during display of the state information.

7. The method of claim 6, wherein the control kit further comprises a memory configured to store a plurality of operational patterns of the water purifier, and
wherein an operational pattern corresponding to the usage pattern is retrieved from the memory and displayed on the interface during display of the state information.

8. A method of controlling a water purifier, the method comprising
receiving, from a control kit provided separately from the water purifier, state information regarding the water purifier from the water purifier;
displaying, by an interface of the control kit, the state information regarding the water purifier;
receiving, through the interface, an operational pattern of the water purifier;
transmitting, by the control kit, the received operational pattern to the water purifier to set the water purifier to operate according to the operational pattern; and
re-receiving the state information from the water purifier to check an operational pattern set in the water purifier,
wherein the operational pattern is information for controlling a sterilization operation, a hot water generating operation, a cold water generating operation and an ice generating operation, and
wherein the operational pattern comprises at least one of a sterilization period of the water purifier and an ejection temperature of the water purifier, and
wherein the control kit is separate from the water purifier and is configured to wirelessly transmit data to the water purifier for updating an operating system installed in the water purifier.

9. The method of claim 8, wherein the state information comprises an operation history of the water purifier, and
wherein a usage pattern of the water purifier is generated by dividing the operation history of the water purifier into pre-set periods during display of the state information.

10. The method of claim 8, wherein a time of a real time clock (RTC) installed in the water purifier is updated with a time of an RTC installed in the control kit.

* * * * *